July 7, 1942.  V. BARTH ET AL  2,288,934
AUTOMATIC PROJECTOR FOR DISPLAYING TRANSPARENCIES
Filed Nov. 4, 1940

INVENTORS.
Vincent Barth.
Robert C. Stevens.
BY
ATTORNEY.

Patented July 7, 1942

2,288,934

UNITED STATES PATENT OFFICE 2,288,934

AUTOMATIC PROJECTOR FOR DISPLAYING TRANSPARENCIES

Vincent Barth, Venice, and Robert Colby Stevens, Los Angeles, Calif.

Application November 4, 1940, Serial No. 364,190

4 Claims. (Cl. 88—28)

This invention relates to display apparatus and deals with a machine for projecting light through transparencies, such as colored film and the like.

The invention to be described and claimed hereinafter has been conceived and designed for the purpose of displaying small transparencies, such as film, which photographs in natural colors. Film of this nature has been standardized as to size and consequently a machine for displaying this type of film will be built to the certain dimensions. However, it is evident that the inventive idea embodied in the machine need not be confined to displaying only this particular type of film but may also be made in different dimensions for displaying transparencies of other sizes, such as lantern slides, etc.

The primary object of this invention is to provide a continuous, automatic device whereby a series of transparencies, or pictures, may be moved successively and intermittently through a projector for projecting the images on the film onto a screen in the well known manner. A more specific object of the invention is to provide an endless belt arranged to be supported upon a plurality of pulleys with means for mounting a series of pictures upon said belt.

Another object is to provide a belt and pulley arrangement of the above character wherein the belt is meshed with at least one of said pulleys and said pulley is the mover of said belt.

Another object resides in the provision of means for intermittently driving one of said above mentioned pulleys so that successive pictures mounted upon said belt will be brought into registration in the projection field of an optical system.

A further object is to provide an endless belt having means thereon for mounting a series of transparent pictures, said belt being arranged to pass said pictures through the projection field of an optical system with means for intermittently moving successive pictures into said projection field.

Still another object is to provide a simplified, durable means for moving said belt intermittently.

Other objects and advantages will become apparent as the description proceeds in conjunction with the drawing, in which.

Briefly stated, the invention amounts to the combination of a conventional projector, with an intermittently moving endless member for bringing a series of pictures into successive registration with the optical axis of the projector.

Figure 1:
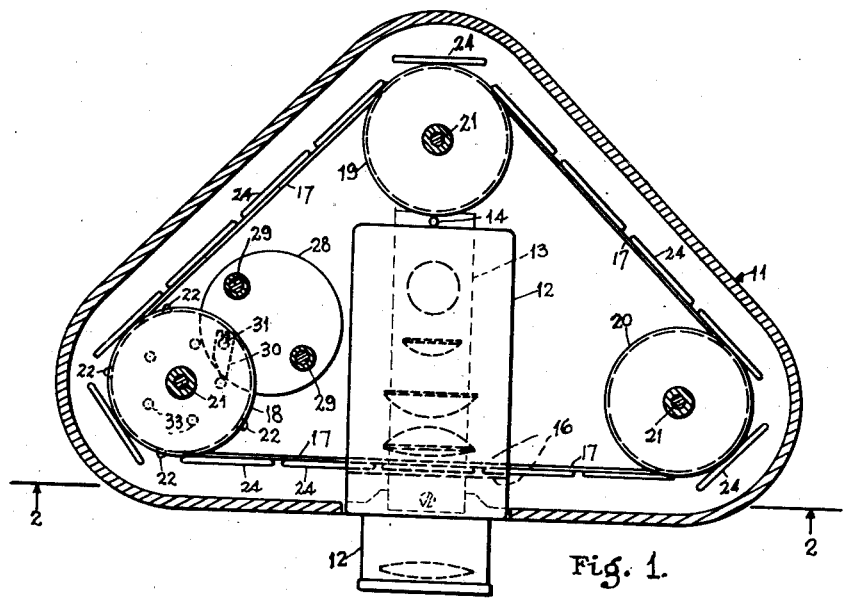
Figure 1 is a horizontal section taken on line 1—1 of Figure 2.
Figure 2:
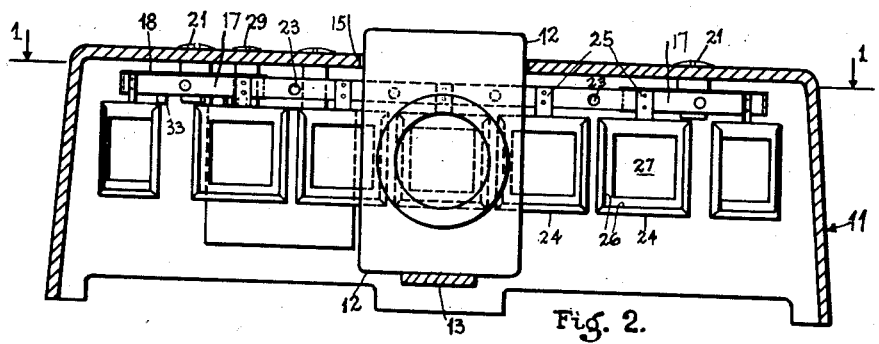
Figure 2 is a vertical section taken on line 2—2 of Figure 1.
Figures 3, 4:
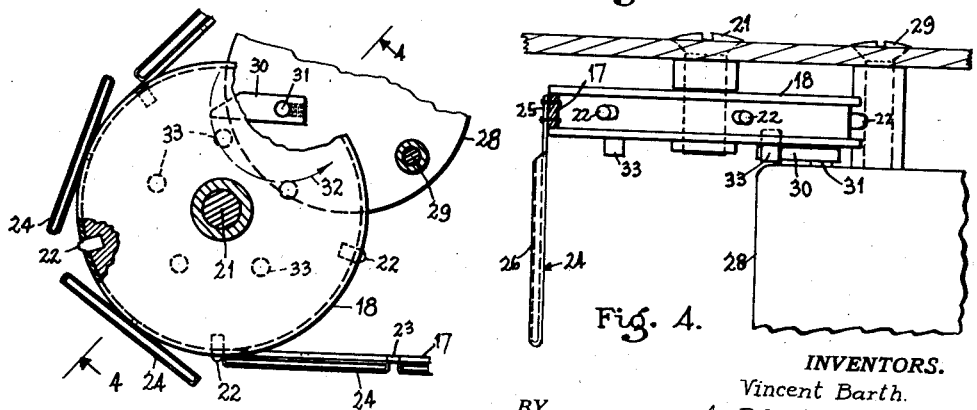
Figure 3 is an enlarged fragmentary plan view of the driving means for the endless belt.
Figure 4 is a vertical view partly in section taken on line 4—4 of Figure 3.

Since it is contemplated to use a standard projector, no description of the projector will be entered here. Referring to the drawing, it will be seen that our invention comprises a casing generally designed 11. As shown, this casing is open at the bottom and has side walls with a top wall. This particular construction is for the purpose of mounting the parts of our apparatus upon the top wall so as to leave the bottom of the casing open and free of obstruction, and provide an easy access for assembling and consequently a cheaper construction. A projector 12 of the type mentioned is mounted upon a plate 13, which in turn is supported upon the casing at the forward end, as shown in dotted lines on Figure 1, and at the rear end is supported by a bolt 14 extending through the upper wall of the casing. The top wall of the casing is provided with an opening 15 to allow the projector to extend through the casing. This of course is not necessary, since the casing may be made to include the projector, or a smaller projector casing could be used. The projector contains the usual source of illumination and the optical system with which we are not concerned herein. The only thing that might be mentioned in connection with the projector is that there must be a slide slot 16 that will permit the passage of an endless transparency carrying member therethrough. The slide slot on the average projector ordinarily is not big enough for this purpose, and consequently must be enlarged.

The means for carrying the transparencies consists of an endless belt mounted upon a plurality of pulleys. The belt may be either of a fabric or a leather type with means for gearing the belt to the pulley so as to prevent slippage, or it may be of the chain and sprocket construction, the only requirement being that the belt must be geared to one or more of the supporting rotating members. In this instance we have shown a flexible belt 17 mounted upon flanged pulleys 18, 19, and 20. These pulleys in turn are supported on the under side of the top wall of the casing by any suitable means, such as indicated at 21. The means for gearing the belt to one of the pulleys, in this case the pulley 18, consists of pins 22 in the pulley arranged to mesh with holes 23 in the belt. This is a well known means of gearing a friction belt to a pulley. Suspended from the belt at regular intervals is a plurality of picture carrying members 24. These members may be attached to the belt in any suitable manner, such as by tongues 25 riveted to the belt. In the case of a chain mounted on sprockets, the picture carrying members may be incorporated on the chain by soldering, spot welding, or by utilizing one or more of the pivot pins in the chain. The picture carrying members are each equipped with flanges 26 and apertures 27 and are open at the top so that a picture may be slid into position very easily from the top side. An opening in the side wall or the top of the casing 11 may be formed in any convenient spot for loading the picture carrying members. As before stated, the projector 12 is equipped with a slot 16 for the purpose of receiving the transparencies and under our arrangement the belt 17, with the picture carrying frames 24, passes through this slot and brings the successive pictures into registration with the optical system by means of an intermittent moving mechanism consisting of a motor 28 suitably mounted to the top wall of the casing by bolts 29, said motor having an arm 30 coupled to the drive shaft 31 of the motor by any suitable speed reducing means to provide the required speed of rotation. The arm 30 rotates in the direction of the arrow 32 and is arranged to engage depending pins 33 mounted on the under side of the pulley 18. As the arm rotates, it engages successive pins and rotates the pulley 18 a predetermined distance, which distance is just sufficient to bring the picture frames 24 into successive registration with the optical system of the projector 12. The pulley 18 being geared to the belt 17, by means of the pins 22 operating in the holes 23 of the belt, provides a non-slip engagement between the pulley and the belt and insures that the predetermined movement of the pulley brought about by the arm and pin arrangement 30—33 will move successive pictures into exact registration with the optical system.

An apparatus of the foregoing type provides a means of displaying transparencies in a continuous succession. The construction is simple, durable, fool-proof, automatic, and is not apt to get out of order since the few moving parts are rugged and not subject to wear.

We claim:

1. A device for projecting a series of pictures comprising a casing, a picture projector mounted in said casing, three or more pulleys mounted on said casing in a substantially horizontal plane, a single endless member mounted upon said pulleys and geared to at least one of said pulleys, said member passing through the optical field of said projector, means for mounting a plurality of depending pictures upon said endless member, and means for intermittently driving said pulley geared to said endless member to successively register individual pictures supported on said endless member in the said optical field of said projector.

2. A device for projecting a series of pictures comprising a substantially flat casing open on the underside, three or more wheels rotatably mounted on the underside of the top wall of said casing, a single endless carrier member mounted upon and supported by said wheels in a substantially horizontal plane and geared to at least one of said wheels, a plurality of picture carrying frames attached to and depending from said endless member, and means for intermittently driving said wheel geared to said endless member to successively register said picture frames in an optical field of the picture projector.

3. In a device for projecting a series of pictures having an endless carrier member for moving said pictures into and out of the optical field of a picture projector, means for intermittently moving said picture carrier member, said means comprising a rotatable member geared to said picture carrying member, a series of spaced pins extending from the face of said rotatable member, an arm mounted upon a rotatable shaft adapted to successively engage said pins and move them a predetermined distance, and means for rotating said shaft.

4. A device for projecting a series of pictures comprising a supporting member, a picture projector mounted on said supporting member, three or more pulleys mounted on said supporting member in a substantially horizontal plane, a single endless carrier member mounted upon said pulleys and geared to at least one of said pulleys, said carrier member passing through the optical field of said projector, means for mounting a plurality of depending pictures upon said carrier member, and means for intermittently driving said pulley geared to said carrier member to successively register individual pictures supported on said carrier member in the said optical field of said projector.

VINCENT BARTH.
ROBERT COLBY STEVENS.